(12) United States Patent
Liu et al.

(10) Patent No.: US 10,920,406 B2
(45) Date of Patent: Feb. 16, 2021

(54) LEAK-PROOF DEVICE FOR WATER INLET VALVE

(71) Applicant: LAB (XIAMEN) SANITARY FITTINGS INC., Fujian (CN)

(72) Inventors: Yongmao Liu, Xiamen (CN); Zipeng Zhang, Xiamen (CN)

(73) Assignee: LAB (XIAMEN) SANITARY FITTINGS INC., Fujian (CN)

( * ) Notice: Subject to any disclaimer, the term of this patent is extended or adjusted under 35 U.S.C. 154(b) by 83 days.

(21) Appl. No.: 16/344,801

(22) PCT Filed: Jan. 24, 2017

(86) PCT No.: PCT/CN2017/072318
§ 371 (c)(1),
(2) Date: Apr. 25, 2019

(87) PCT Pub. No.: WO2018/137053
PCT Pub. Date: Aug. 2, 2018

(65) Prior Publication Data
US 2020/0056357 A1    Feb. 20, 2020

(51) Int. Cl.
*F16K 31/28* (2006.01)
*E03D 1/32* (2006.01)
*F16K 31/34* (2006.01)

(52) U.S. Cl.
CPC .............. *E03D 1/32* (2013.01); *F16K 31/28* (2013.01); *F16K 31/34* (2013.01); *Y10T 137/7413* (2015.04); *Y10T 137/7472* (2015.04)

(58) Field of Classification Search
CPC . E03D 1/32; F16K 31/28; F16K 31/24; F16K 31/34; Y10T 137/7413; Y10T 137/7472
See application file for complete search history.

(56) References Cited

U.S. PATENT DOCUMENTS

| | | | |
|---|---|---|---|
| 2008/0078454 A1* | 4/2008 | Nichols-Roy | F16K 31/26 137/411 |
| 2017/0260727 A1* | 9/2017 | Huang | E03D 1/34 |
| 2018/0291606 A1* | 10/2018 | Huang | E03D 1/32 |

FOREIGN PATENT DOCUMENTS

WO    WO-2009141518 A2 * 11/2009 ............. F16K 31/30

* cited by examiner

*Primary Examiner* — Umashankar Venkatesan
(74) *Attorney, Agent, or Firm* — Leong C. Lei

(57) ABSTRACT

Disclosed is a leak-proof device for a water inlet valve. A control valve is installed in a valve body for opening and closing a water inlet channel and a water outlet channel. An outer water tank and a leak-proof water tank are installed on the valve body. An inner water tank is disposed in the outer water tank, with the height of the inner water tank being lower than that of the outer water tank. The leak-proof water tank is in communication with the inner water tank via a water-passing channel A lever is pivotally connected to the valve body. Two ends of the lever are connected with an outer float and an inner float. The inner float is provided with a plug that is movable to block the water-passing channel. The leak-proof float is connected to the control valve.

10 Claims, 15 Drawing Sheets

LEAK-PROOF DEVICE FOR WATER INLET VALVE

BACKGROUND OF THE INVENTION

1. Field of the Invention

The present invention relates to a water inlet valve, and more particularly to a leak-proof device for a water inlet valve.

2. Description of the Prior Art

A conventional water inlet valve generally includes a water inlet pipe, a top cover, a back-pressure pad, a swing arm, a float, and a water stop tank. The lower end of the water inlet pipe is installed on a water supply pipe of the water tank. The top cover is installed at the upper end of the water inlet pipe. The top cover is formed with a back-pressure hole. The middle portion of the swing arm is pivotally connected to the top cover. One end of the swing arm faces the back-pressure hole and is connected with the back-pressure pad. The other end of the swing arm is connected with an adjustment rod of the float. The float is installed in the water stop tank. The water stop tank is installed on the water inlet pipe. Sealing members are provided between the components to ensure water tightness.

In use, when the water level of the water stop tank lowers, the float is lowered by the gravity and the swing arm is deflected, so that the back-pressure pad opens the back-pressure hole, and the water flows from the water supply pipe through the water inlet pipe, the top cover and the back-pressure hole to the water tank to feed in water. When the water level of the water stop tank rises, the float is lifted by the buoyancy and the swing arm is deflected, so that the back-pressure pad closes the back-pressure hole, and the back-pressure pad blocks the water inlet to stop water.

Another conventional water inlet valve includes a valve body, a valve cover, a water stop pad, a first crank arm, a second crank arm, a control rod, a float, and a water stop tank. The valve cover is installed in the valve body to form a water inlet cavity with the valve body. A water stop surface having a water inlet hole is formed in the water inlet cavity. A water inlet end of the water inlet cavity communicates with a water inlet channel. A water outlet end of the water inlet cavity communicates with a water outlet channel. The water stop pad is mounted on the valve cover over the water stop surface. The water stop pad is formed with a water-passing hole. A back-pressure cavity is formed between the water stop pad and the valve cover. The valve cover is formed with a back-pressure hole. The back-pressure hole communicates with the back-pressure cavity and the outside. The second crank arm is pivotally connected to the valve cover through a second rotating shaft perpendicular to the valve cover. The second rotating shaft divides the second crank arm into a long arm and a short arm. The end of the long arm is a free end. The fixed end of the first crank arm is pivotally connected to the valve cover through a first rotating shaft perpendicular to the valve cover. The free end of the first crank arm is slidably connected to the short arm of the second crank arm across the back-pressure hole. The first crank arm is provided with a back-pressure pad opposite to the back-pressure hole. The free end of the long arm is connected with a control rod disposed on the float. The float is disposed in the water stop tank. The water stop tank is mounted on the valve body.

When the water level of the water stop tank lowers, the float is lowered by gravity, and the control lever is lowered to drive the second crank arm to swing downward, the first crank arm is driven to swing away from the back-pressure hole, so that the back-pressure pad opens the back-pressure hole, and the water enters the water tank through the water inlet channel of the valve body to feed in water. When the water level of the water stop tank rises, the float is lifted by the buoyancy, and the control rod is lowered, and the second crank arm is swung upward to drive the first crank arm to swing close to the back-pressure hole, so that the back-pressure pad closes the back-pressure hole again. The water stop pad generates back pressure and is deformed to seal the water inlet hole of the water stop surface to stop water.

The water inlet valve is provided with a water leakage hole at the bottom of the water stop tank. After the water level of the water tank is lowered, the water in the water stop tank enters the water tank through the water leakage hole, so that the float loses buoyancy and is lowered by gravity, which causes the swing arm to deflect and open the back-pressure hole to feed in water. However, after the water tank is used for a period of time, it is prone to failure and cannot be closed. For example, the drain valve leaks. At this time, the water inlet valve continues to feed in water, and the water tank continues to leak, resulting in waste of water resources.

Accordingly, the inventor of the present invention has devoted himself based on his many years of practical experiences to solve these problems.

SUMMARY OF THE INVENTION

The primary object of the present invention is to provide a leak-proof device for a water inlet valve. When the water tank leaks, the leak-proof device stops the water inlet valve from feeding in water in a timely manner to save on water resources.

In order to achieve the above object, the present invention adopts the following solutions.

A leak-proof device for a water inlet valve comprises a valve body, an outer water tank, an inner water tank, a leak-proof water tank, an outer float, an inner float, a leak-proof float, and a lever. A water inlet channel and a water outlet channel are formed in the valve body. A control valve is installed in the valve body. The control valve controls opening and closing of the water inlet channel and the water outlet channel. The outer water tank is installed on the valve body. A water inlet hole is disposed at a bottom of the outer water tank. The inner water tank is disposed in the outer water tank. The inner water tank has a height lower than that of the outer water tank. Water overflows from the outer water tank to the inner water tank. The lever is pivotally connected to the valve body. One end of the lever is connected to the outer float. The outer float is disposed in the outer water tank. Another end of the lever is connected to the inner float. The inner float is disposed in the inner water tank. A plug is mounted to a lower end of the inner float. The leak-proof water tank is mounted on the valve body. The leak-proof water tank is in communication with the inner water tank via a water-passing channel. The lever is swung for the plug to close the water-passing channel or to open the water-passing channel. The leak-proof float is disposed in the leak-proof water tank. The leak-proof float is connected to the control valve. When the leak-proof float rises, the control valve is driven to close the water inlet channel of the valve body.

Preferably, the control valve includes a valve stem, a water plugging stopper, and a drive mechanism. A water sealing surface is disposed between the water inlet channel and the water outlet channel. The water sealing surface is in communication with the water inlet channel and the water outlet channel. A cavity is formed in the valve body above the water sealing surface. A mounting hole is formed in the valve body above the cavity. A middle portion of the valve stem is movably and sealedly mounted in the mounting hole. An upper portion of the valve stem extends out of the mounting hole and is connected to the drive mechanism. The drive mechanism drives the valve stem to move up and down. A back-pressure hole is formed in the water plugging stopper. A lower portion of the valve stem is movably mounted in the back-pressure hole of the water plugging stopper. The water plugging stopper is disposed in the cavity. A water-passing gap is defined between the water plugging stopper and the cavity. A back-pressure cavity is formed above the water-plugging stopper. The water-passing gap is in communication with the water inlet channel and the back-pressure cavity. The back-pressure cavity is in communication with the back-pressure hole. The back-pressure hole is in communication with the water outlet channel A sealing end surface matching the back-pressure hole is formed on the valve stem. When the valve stem moves upwards, the sealing end surface opens the back-pressure hole, and the water inlet channel is in communication with the water outlet channel to feed in water. When the valve stem moves downwards and drives the water plugging stopper to move downwards, the sealing end surface blocks the back-pressure hole and the water plugging stopper blocks the water sealing surface, such that the water enters the back-pressure cavity via the water-passing gap, and water pressure enables the water-plugging stopper to block the water sealing surface to stop the water.

Preferably, the lower portion of the valve stem is formed with a reduced neck section, and the reduced neck section of the valve stem is inserted in the back-pressure hole of the water plugging stopper.

Preferably, the reduced neck portion has a length greater than that of the back-pressure hole.

Preferably, the sealing end surface is a wedge surface, and an upper end of the back-pressure hole is formed with a sealing slope matching the wedge surface.

Preferably, an annular raised rib is formed on the water sealing surface. Preferably, a sealing piston is sleeved on the middle portion of the valve stein, and the sealing piston is sealedly matched with the mounting hole of the valve body.

Preferably, the water plugging stopper is composed of an injection-molded member and a rubber member. An accommodating cavity is formed in the injection-molded member. The rubber member is embedded and installed in the accommodating cavity of the injection-molded member.

Preferably, the drive mechanism includes a swing rod, a compression spring, a connecting rod, and a limiting member. A middle portion of the swing rod is pivotally connected to the valve body. One end of the swing rod is connected to the valve stein. The valve stein moves up and down with the swing rod. Another end of the swing rod is connected to one end of the connecting rod. The compression spring is mounted in the valve body. One end of the compression spring abuts against the valve body. Another end of the compression spring abuts against the other end connected with the connecting rod of the swing rod for applying a force to swing the swing rod. The limiting member is movably mounted on the valve body. The limiting member is configured to restrict movement of the connecting rod. When the limiting member is pressed downwards to release the connecting rod, the compression spring drives the swing rod to swing and move the valve stein and the water plugging stopper downwards.

Preferably, the limiting member is movably mounted in the valve body. A return spring is mounted between the limiting member and the valve body. A first magnetic element is mounted in the limiting member. A second magnetic element that can be attracted to the first magnetic element is mounted to an upper end of the leak-proof float. When the leak-proof float rises, the second magnetic element is attracted to the first magnetic element to move the limiting member downwards to release the connecting rod.

Preferably, an upper end of the limiting member is provided with a wedge portion. The connecting rod is provided with a recess corresponding to the wedge portion. The wedge portion of the limiting member is inserted into the recess of the connecting rod to restrict movement of the connecting rod.

Preferably, the valve body is provided with a mounting seat. A receiving cavity is formed between the mounting seat and the valve body. The limiting member is disposed in the receiving cavity. A hole is formed in the mounting seat. A middle portion of the limiting member is a limiting portion. The first magnetic element is mounted in a lower portion of the limiting member. The lower portion of the limiting member is inserted into the hole. The limiting portion of the limiting member has a diameter greater than that of the hole. One end of the return spring abuts against the mounting seat, and another end of the return spring abuts against the limiting portion of the limiting member.

Preferably, the swing rod is connected to the connecting rod through an engaging block and an engaging groove.

Preferably, the swing rod is provided with the engaging block, and the connecting rod is provided with the engaging groove. The engaging block of the swing rod is engaged in the engaging groove of the connecting rod to connect the swing rod to the connecting rod.

Preferably, the connecting rod is radially connected to the swing rod.

After adopting the above solutions, when the water inlet valve of the present invention normally feeds in water, the water enters the outer water tank from the water inlet hole at the bottom of the outer water tank, and the water level of the outer water tank rises, so that the outer float placed in the outer water tank rises, the lever is driven to swing and link the inner float placed in the inner water tank to lower, so that the plug installed at the lower end of the inner float blocks the water-passing channel that communicates the inner water tank with the leak-proof water tank. As the water level of the outer water tank continues to rise, the water overflows into the inner water tank. At this time, the water of the inner water tank cannot enter the leak-proof water tank, and the leak-proof float placed in the leak-proof water tank does not actuate (does not float upwards), and the control valve opens the water inlet channel of the valve body, such that the water inlet valve feeds in water normally.

When the water tanks leaks, the water level of the outer water tank gradually lowers, and the outer float placed in the outer water tank lowers, the lever is swung to drive the inner float placed in the inner water tank to rise, so that the plug installed at the lower end of the inner float opens the water-passing channel that communicates the inner water tank with the leak-proof water tank. The water in the inner water tank flows into the leak-proof water tank, and the leak-proof float placed in the leak-proof water tank actuates (float upwards). The leak-proof float rises and the control valve is driven to close the water inlet channel of the valve body to stop the water. Therefore, when the water tank leaks, the leak-proof device stops the water inlet valve from feeding in water in a timely manner to save on water resources.

DETAILED DESCRIPTION OF THE PREFERRED EMBODIMENTS

Figure 1:
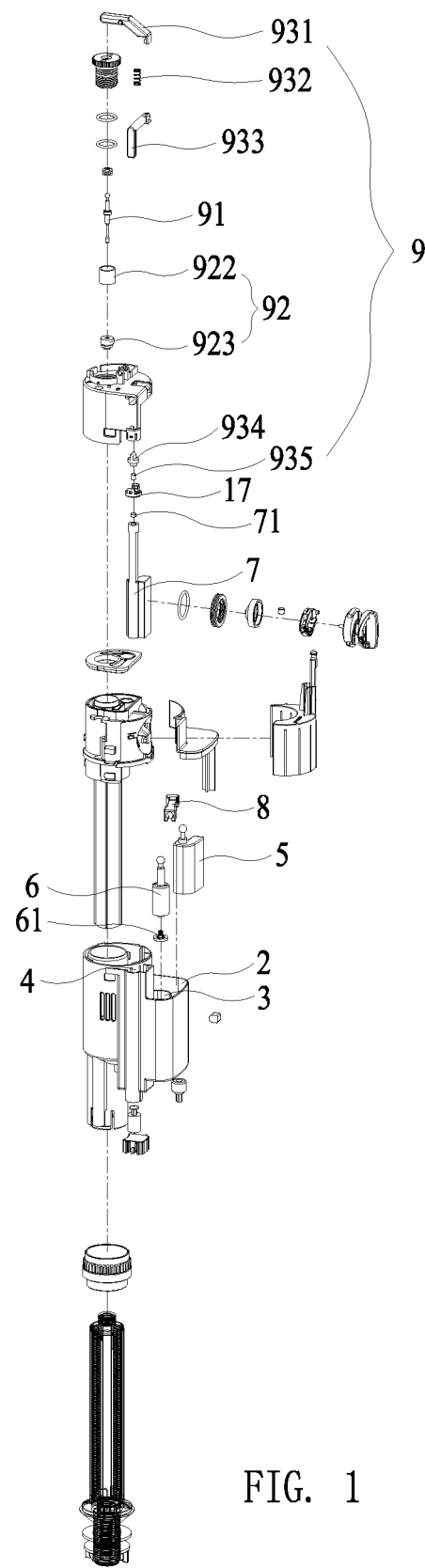
FIG. 1 is an exploded view of the present invention.
Figure 2:
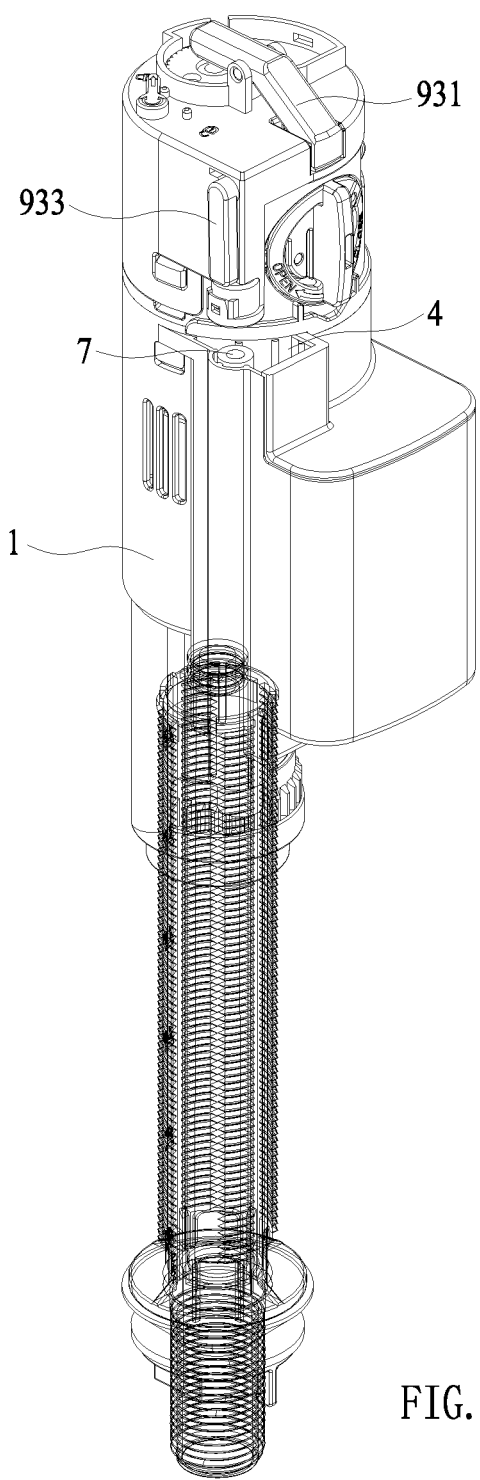
FIG. 2 is a schematic view of the present invention in a state of feeding in water.
Figure 3:
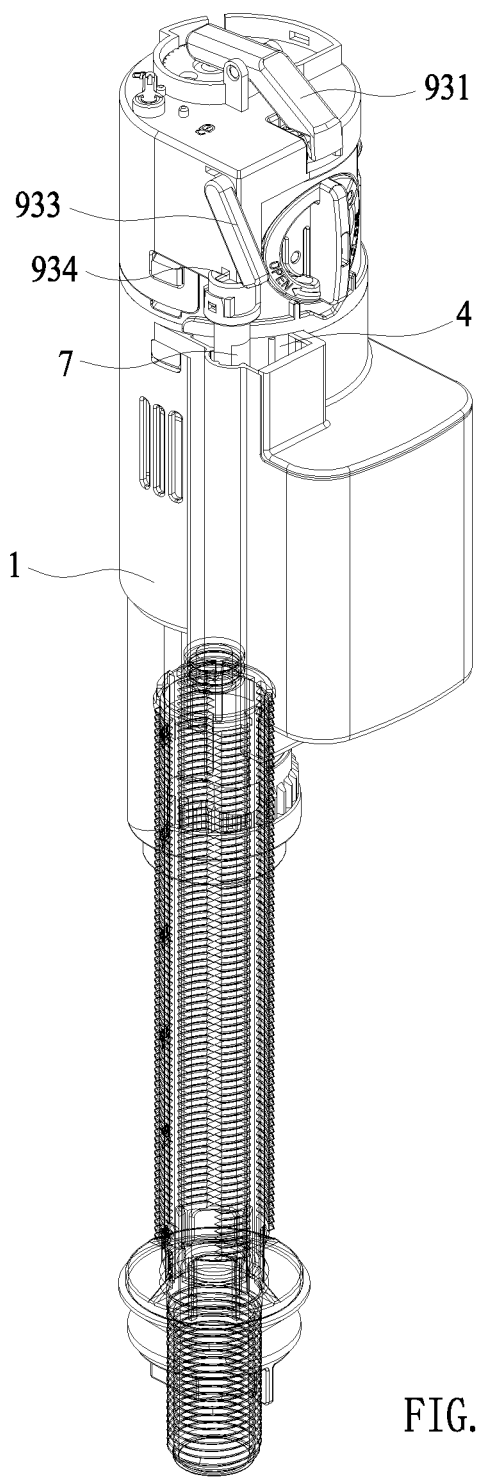
FIG. 3 is a schematic view of the present invention in a state of stopping water.

Embodiments of the present invention will now be described, by way of example only, with reference to the accompanying drawings.

Referring to FIG. 1 to FIG. 14, the present invention discloses a leak-proof device for a water inlet valve, comprising a valve body 1, an outer water tank 2, an inner water tank 3, a leak-proof water tank 4, an outer float 5, an inner float 6, a leak-proof float 7, and a lever 8.

Figure 10:
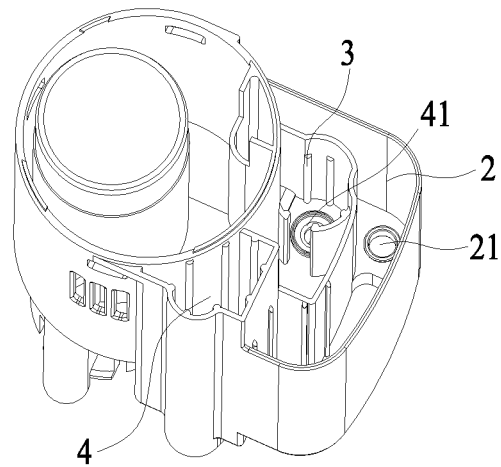
FIG. 10 is a schematic view of the water tank of the present invention.
Figure 11:
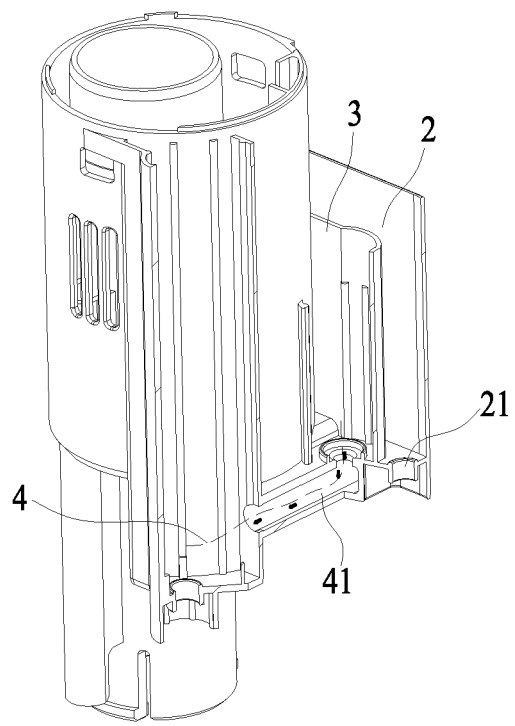
FIG. 11 is a cross-sectional view of the water tank of the present invention.

A water inlet channel 11 and a water outlet channel 12 are formed in the valve body 1. A control valve 9 is installed in the valve body 1. The control valve 9 controls the opening and closing of the water inlet channel 11 and the water outlet channel 12. The outer water tank 2 is installed on the valve body 1. A water inlet hole 21 is disposed at the bottom of the outer water tank 2. As shown in FIG. 10 and FIG. 11, the inner water tank 3 is disposed in the outer water tank 2. The height of the inner water tank 3 is lower than that of the outer water tank 2. Water overflows from the outer water tank 2 to the inner water tank 3.

Figure 12:
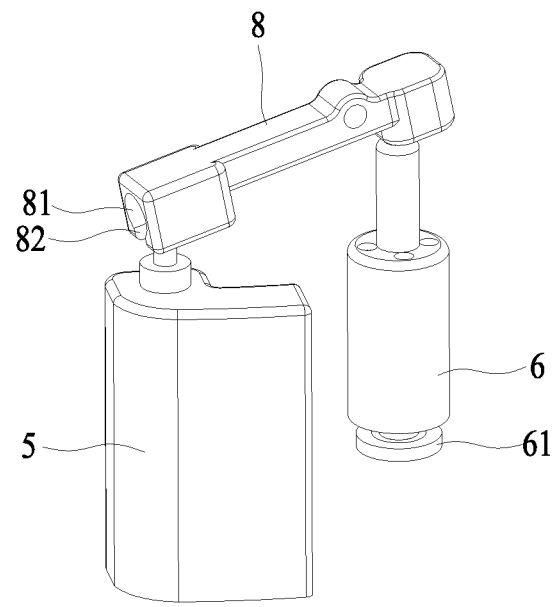
FIG. 12 is a schematic view showing the assembly of the lever and the float of the present invention.
Figure 13:
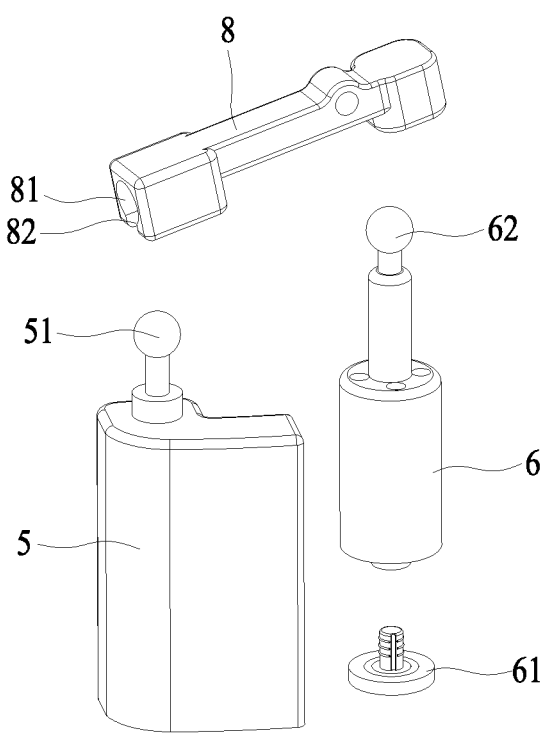
FIG. 13 is an exploded view showing the lever and the float of the present invention.
Figure 14:
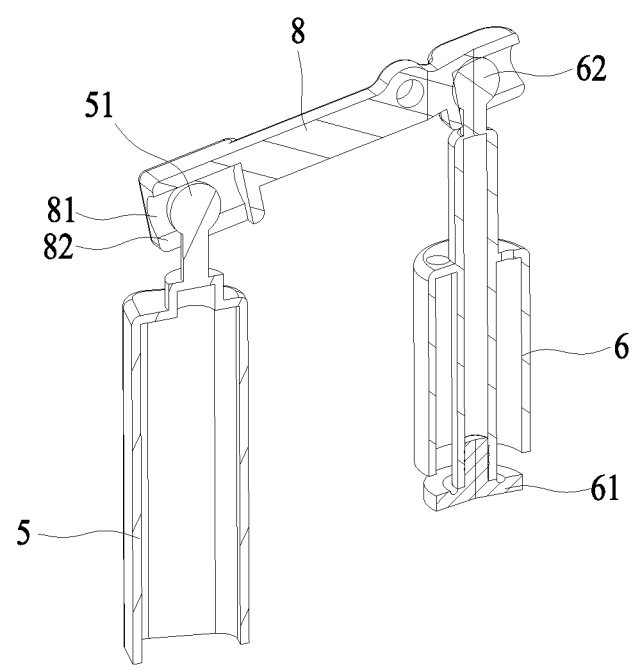
FIG. 14 is a cross-sectional view showing the assembly of the lever and the float of the present invention.

The lever 8 is pivotally connected to the valve body 1. One end of the lever 8 is connected to the outer float 5. The outer float 5 is disposed in the outer water tank 2. Another end of the lever 8 is connected to the inner float 6. The inner float 6 is disposed in the inner water tank 3. A plug 61 is mounted to a lower end of the inner float 6. In this embodiment, as shown in FIG. 12 to FIG. 14, an engaging hole 81 is formed in either end of the lever 8. The bottom of the engaging hole 81 is provided with a slot 82. A first ball head 51 and a second ball head 62 are connected to the outer float 5 and the inner float 6, respectively. The first ball head 51 and the second ball head 62 are engaged in the engaging holes 81 at the two ends of the lever 8, respectively.

The leak-proof water tank 4 is mounted on the valve body 1. The leak-proof water tank 4 is in communication with the inner water tank 3 via a water-passing channel 41. The lever 8 is swung for the plug 61 to close the water-passing channel 41 or to open the water-passing channel 41. The leak-proof float 7 is disposed in the leak-proof water tank 4. The leak-proof float 7 is connected to the control valve 9. When the leak-proof float 7 rises, the control valve 9 is driven to close the water inlet channel 11 of the valve body 1.

The control valve 9 may be a conventional control valve. Preferably, as shown in FIG. 4 to FIG. 8, the control valve 9 includes a valve stein 91, a water plugging stopper 92, and a drive mechanism 93. A water sealing surface 13 is disposed between the water inlet channel 11 and the water outlet channel 12. The water sealing surface 13 is in communication with the water inlet channel 11 and the water outlet channel 12. A cavity 14 is formed in the valve body 1 above the water sealing surface 13. A mounting hole 15 is formed in the valve body 1 above the cavity 14. A middle portion of the valve stein 91 is movably and sealedly mounted in the mounting hole 15. An upper portion of the valve stein 91 extends out of the mounting hole 15 and is connected to the drive mechanism 93. The drive mechanism 93 drives the valve stein 91 to move up and down. A back-pressure hole 921 is formed in the water plugging stopper 92. A lower portion of the valve stein 91 is movably mounted in the back-pressure hole 921 of the water plugging stopper 92. The water plugging stopper 92 is disposed in the cavity 14. A water-passing gap is defined between the water plugging stopper 92 and the cavity 14. A back-pressure cavity 16 is formed above the water-plugging stopper 92. The water-passing gap is in communication with the water inlet channel 11 and the back-pressure cavity 16. The back-pressure cavity 16 is in communication with the back-pressure hole 921. The back-pressure hole 921 is in communication with the water outlet channel 12. A sealing end surface 911 matching the back-pressure hole 921 is formed on the valve stein 91. When the valve stein 91 moves upwards, the sealing end surface 911 opens the back-pressure hole 921, and the water inlet channel 11 is in communication with the water outlet channel 12 to feed in water. When the valve stein 91 moves downwards and drives the water plugging stopper 92 to move downwards, the sealing end surface 911 blocks the back-pressure hole 921 and the water plugging stopper 92 blocks the water sealing surface 13, such that the water enters the back-pressure cavity 16 via the water-passing gap, and the water pressure enables the water-plugging stopper 92 to block the water sealing surface 13 to stop the water.

For the water plugging stopper 92 and the water sealing surface 13 to be sealed better, an annular raised rib 131 is formed on the water sealing surface 13. In this embodiment, the lower portion of the valve stein 91 is formed with a reduced neck section 912. The reduced neck section 912 of the valve stein 91 is inserted in the back-pressure hole 921 of the water plugging stopper 92. Preferably, the length of the reduced neck portion 912 is greater than the length of the back-pressure hole 921. The sealing end surface 911 is a wedge surface. An upper end of the back-pressure hole 921 is formed with a sealing slope matching the wedge surface, so that the sealing performance is better. The water plugging stopper 92 may be integrally formed. In this embodiment, as shown in FIG. 1, the water plugging stopper 92 is composed of an injection-molded member 922 and a rubber member 923. An accommodating cavity is formed in the injection-molded member 922. The rubber member 923 is embedded and installed in the accommodating cavity of the injection-molded member 922. The back-pressure hole 921 is formed in the rubber member 923. A sealing piston 913 is sleeved on the middle portion of the valve stein 91. The sealing piston 913 is sealedly matched with the mounting hole 15 of the valve body 1.

The drive mechanism 93 includes a swing rod 931, a compression spring 932, a connecting rod 933, and a limiting member 934. A middle portion of the swing rod 931 is pivotally connected to the valve body 1. One end of the swing rod 931 is connected to the valve stein 91. The valve stein 91 moves up and down with the swing rod 931. Another end of the swing rod 931 is connected to one end of the connecting rod 933. The compression spring 932 is mounted in the valve body 1. One end of the compression spring 932 abuts against the valve body 1. Another end of the compression spring 932 abuts against the other end connected with the connecting rod 933 of the swing rod 931 for applying a force to swing the swing rod 931.

The limiting member 934 is movably mounted on the valve body 1. The limiting member 934 is configured to restrict the movement of the connecting rod 933. The limiting member 934 can be directly pressed to release the connecting rod 933. In this embodiment, the limiting member 934 is connected with the leak-proof float 7. The rising of the leak-proof float 7 drives the limiting member 934 to release the connecting rod 933. The compression spring 932 drives the swing rod 931 to swing and move the valve stein 91 and the water plugging stopper 92 downwards. The sealing end surface 911 blocks the back-pressure hole 921 and the water plugging stopper 92 blocks the water sealing surface 13, such that the water enters the back-pressure cavity 16 via the water-passing gap, and the water pressure enables the water-plugging stopper 92 to block the water sealing surface 13 to stop the water.

The limiting member 934 is movably mounted in the valve body 1. A return spring 10 is mounted between the limiting member 934 and the valve body 1. A first magnetic element 935 is mounted in the limiting member 934. Specifically, the valve body 1 is provided with a mounting seat 17. A receiving cavity is formed between the mounting seat 17 and the valve body 1. The limiting member 934 is disposed in the receiving cavity. A hole 171 is formed in the mounting seat 17. A middle portion of the limiting member 934 is a limiting portion 9341. The first magnetic element 935 is mounted in a lower portion of the limiting member 934. The lower portion of the limiting member 934 is inserted into the hole 171. The diameter of the limiting portion 9341 of the limiting member 934 is greater than that of the hole 171. One end of the return spring 10 abuts against the mounting seat 17, and another end of the return spring 10 abuts against the limiting portion 9341 of the limiting member 934.

A second magnetic element 71 that can be attracted to the first magnetic element 935 is mounted to an upper end of the leak-proof float 7. When the leak-proof float 7 rises, the second magnetic element 71 is attracted to the first magnetic element 935 to move the limiting member 934 downwards to release the connecting rod 933.

An upper end of the limiting member 934 is provided with a wedge portion 9342. The connecting rod 933 is provided with a recess 9332 corresponding to the wedge portion 9342. The wedge portion 9342 of the limiting member 934 is inserted into the recess 9332 of the connecting rod 932 to restrict the movement of the connecting rod 932. At this time, the valve stem 91 connected with the swing rod 931 does not move, and the water inlet valve normally feeds in water.

Figure 4:
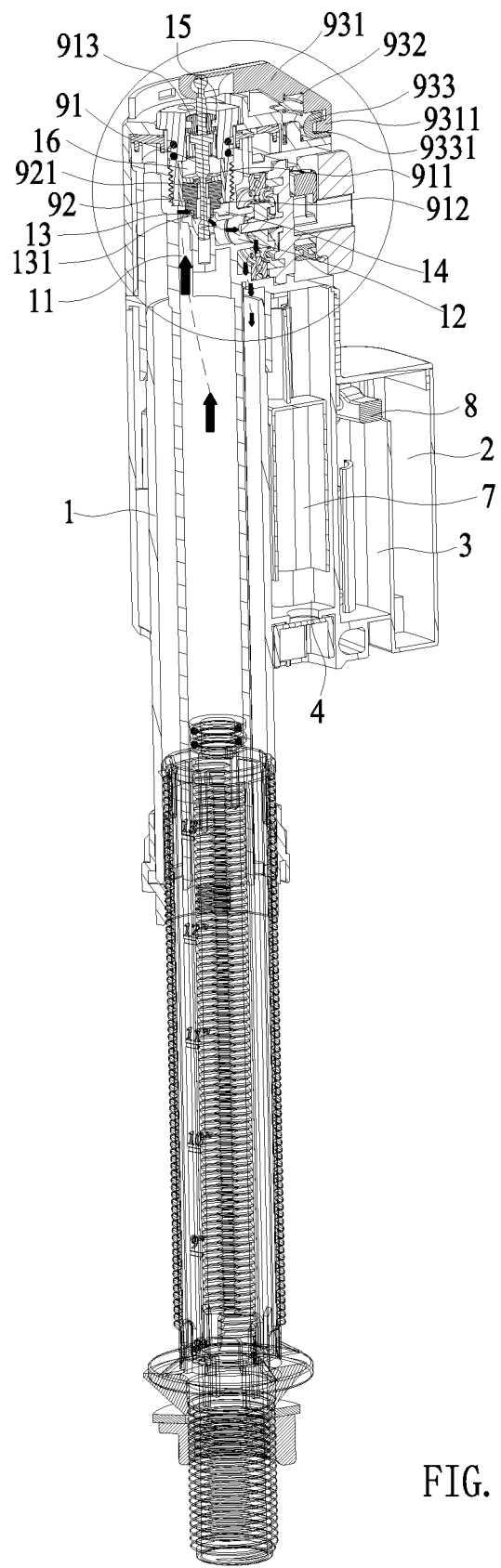
FIG. 4 is a cross-sectional view of the present invention in a state of feeding in water.
Figure 4A:
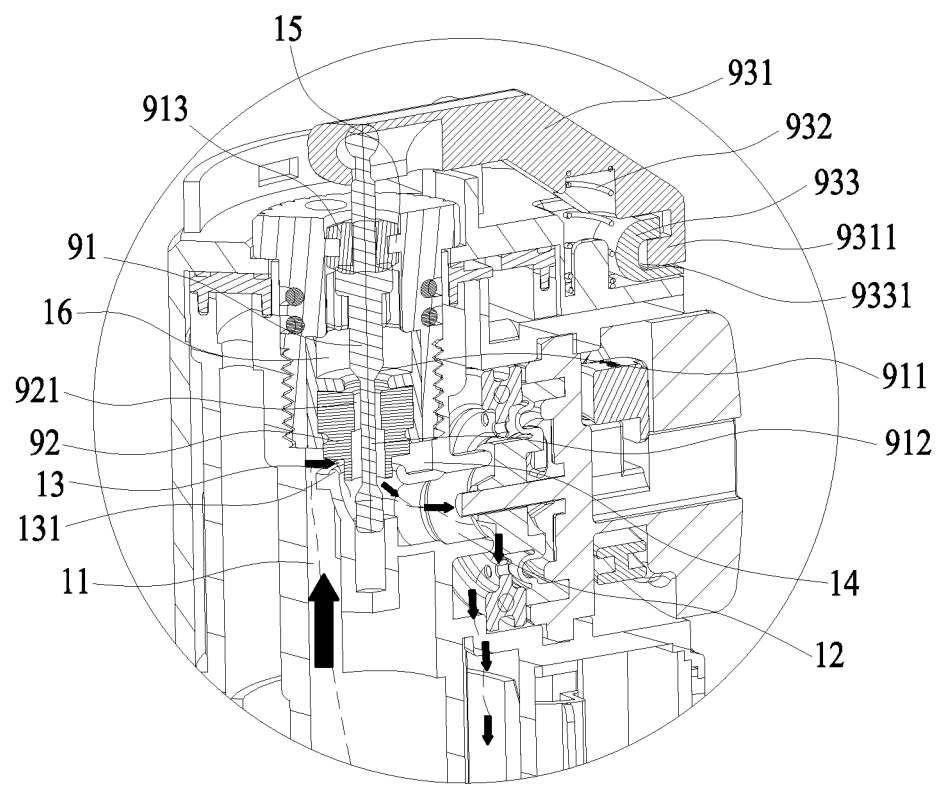
FIG. 4a is a partial enlarged view of FIG. 4.
Figure 5:
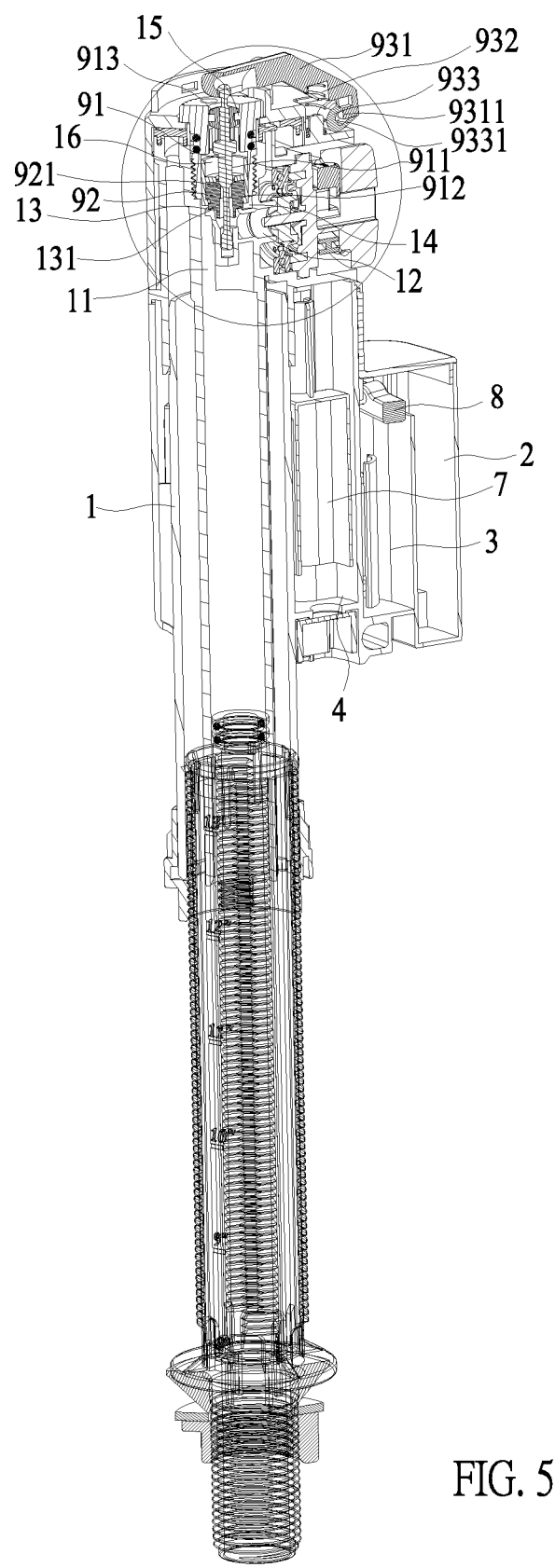
FIG. 5 is a cross-sectional view of the present invention in a state of stopping water.
Figure 5A:
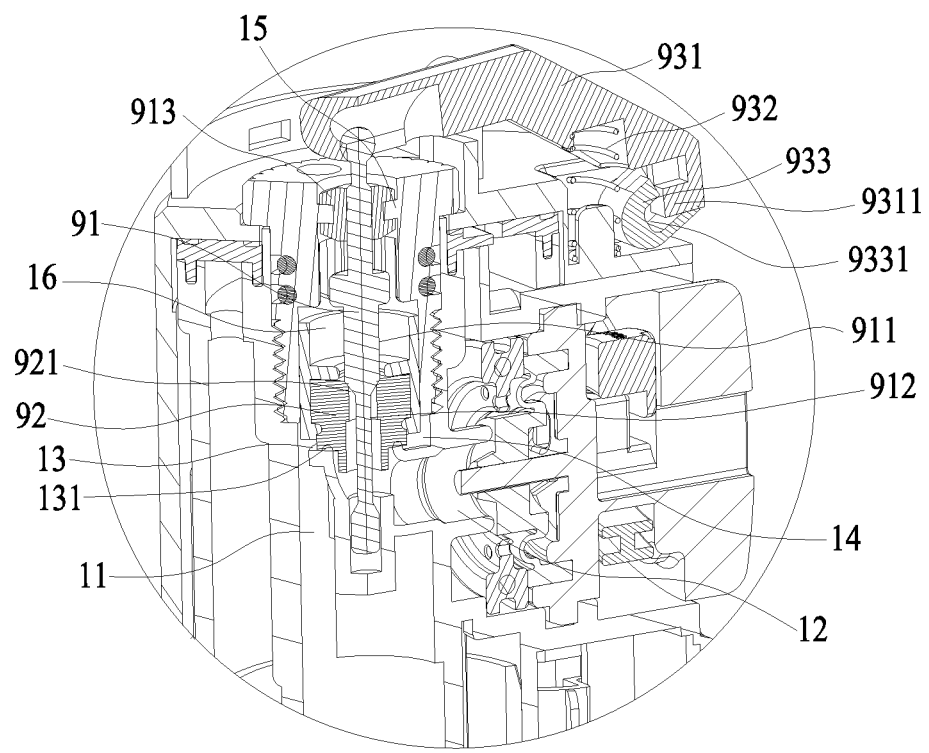
FIG. 5a is a partial enlarged view of FIG. 5.
Figure 6:
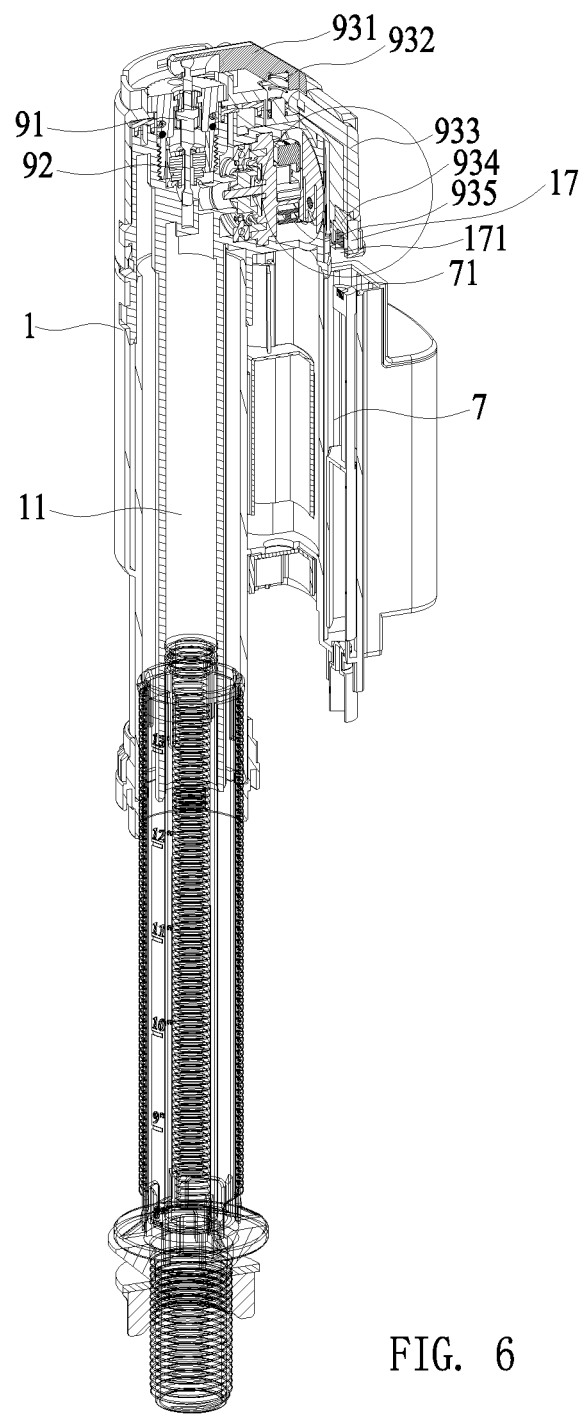
FIG. 6 is a cross-sectional view of the present invention, showing that the magnetic elements are separated from each other.
Figure 6A:
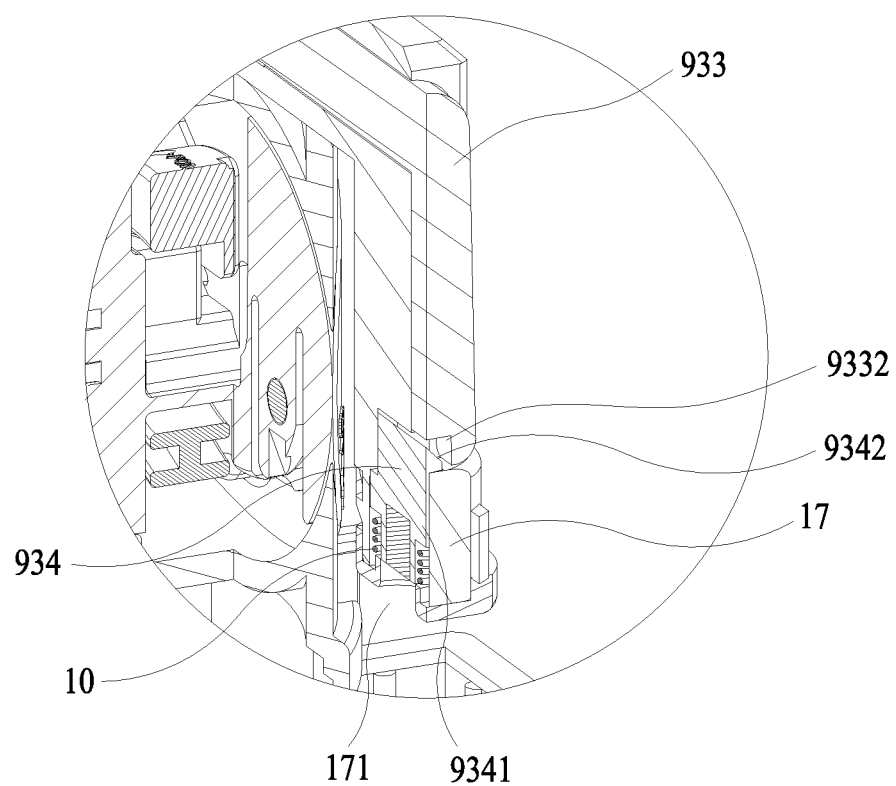
FIG. 6a is a partial enlarged view of FIG. 6.
Figure 7:
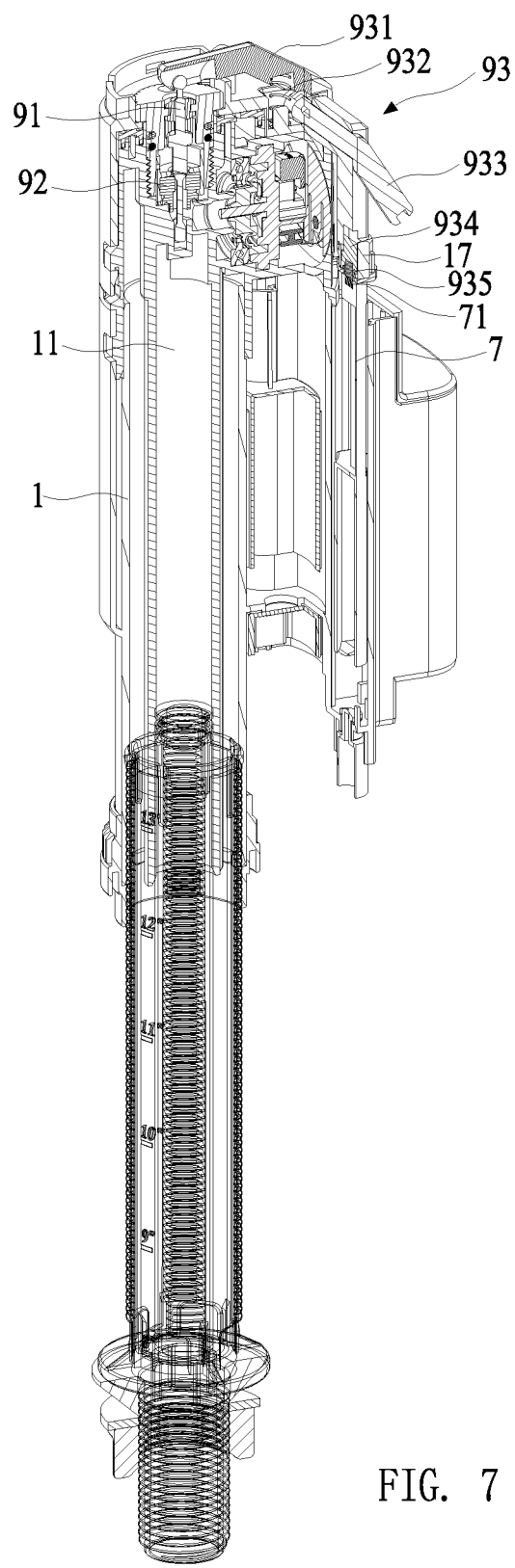
FIG. 7 is a cross-sectional view of the present invention, showing that the magnetic elements are attracted to each other.
Figure 8:
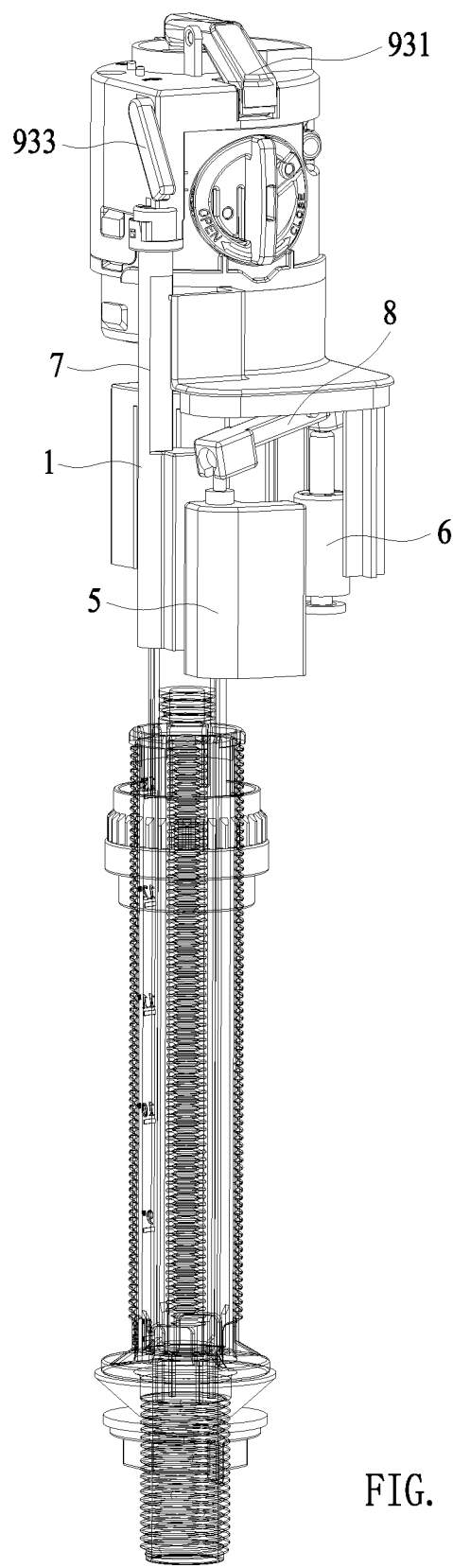
FIG. 8 is a schematic view showing the internal structure of the present invention.
Figure 9:
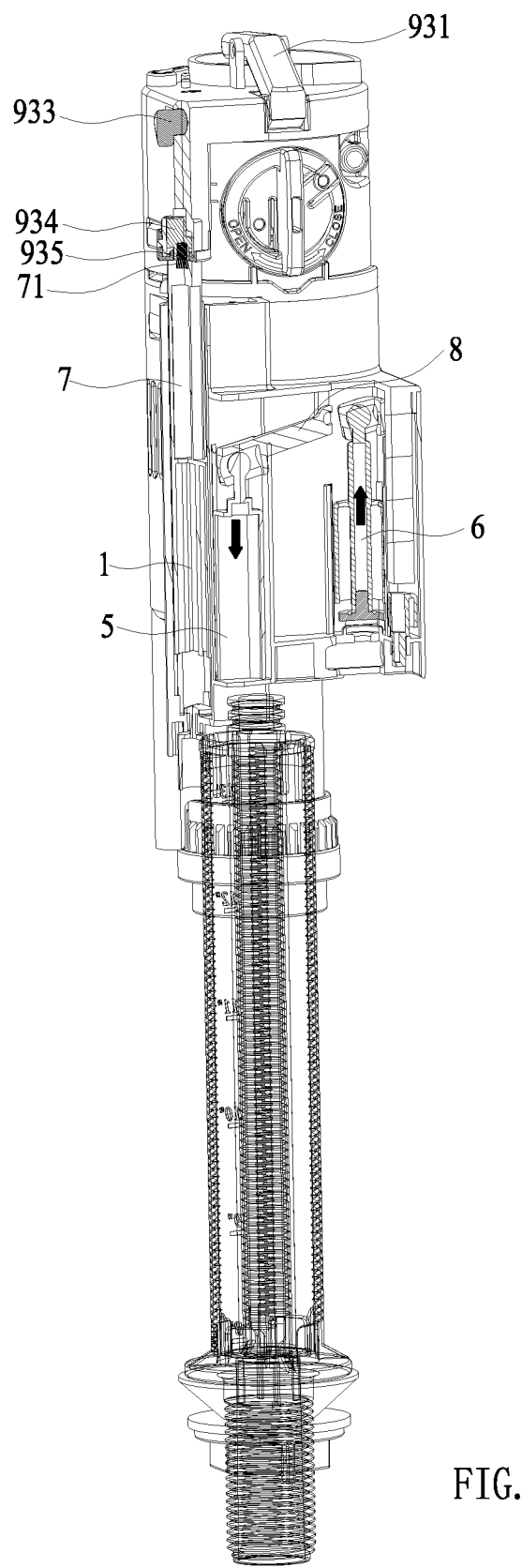
FIG. 9 is a schematic view of the present invention in a water leakage state.

As shown in FIG. 4 and FIG. 5, the swing rod 931 is connected to the connecting rod 933 through an engaging block and an engaging groove. Preferably, the swing rod 931 is provided with an engaging block 9311, and the connecting rod 933 is provided with an engaging groove 9331. The engaging block 9311 of the swing rod 931 is engaged in the engaging groove 9331 of the connecting rod 933 to connect the swing rod 931 to the connecting rod 933. In this embodiment, the connecting rod 933 is radially connected to the swing rod 931.

When the water inlet valve of the present invention normally feeds in water, the water enters the outer water tank 2 from the water inlet hole 21 at the bottom of the outer water tank 2, and the water level of the outer water tank 2 rises, so that the outer float 5 placed in the outer water tank 2 rises, the lever 8 is driven to swing and link the inner float 6 placed in the inner water tank 3 to lower, so that the plug 61 installed at the lower end of the inner float 6 blocks the water-passing channel 41 that communicates the inner water tank 3 with the leak-proof water tank 4. As the water level of the outer water tank 2 continues to rise, the water overflows into the inner water tank 3. At this time, the water of the inner water tank 3 cannot enter the leak-proof water tank 4, and the leak-proof float 7 placed in the leak-proof water tank 4 does not actuate (does not float upwards), and the control valve 9 opens the water inlet channel 11 of the valve body 1, such that the water inlet valve feeds in water normally.

When the water tanks leaks, the water level of the outer water tank 2 gradually lowers, and the outer float 5 placed in the outer water tank 2 lowers, the lever 8 is swung to drive the inner float 6 placed in the inner water tank 3 to rise, so that the plug 61 installed at the lower end of the inner float 6 opens the water-passing channel 41 that communicates the inner water tank 3 with the leak-proof water tank 4. The water in the inner water tank 3 flows into the leak-proof water tank 4, and the leak-proof float 7 placed in the leak-proof water tank 4 actuates (float upwards). The leak-proof float 7 rises to cause the second magnetic element 71 to attract the first magnetic element 935. The limiting member 934 is driven to move down to release the connecting rod 933. The compression spring 932 drives the swing rod 931 to swing, and the valve stein 91 and the water plugging stopper 92 are moved downwards. The sealing end surface 911 blocks the back-pressure hole 921 and the water plugging stopper 92 blocks the water sealing surface 13, such that the water enters the back-pressure cavity 16 via the water-passing gap, and the water pressure enables the water-plugging stopper 92 to block the water sealing surface 13 to stop the water.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A leak-proof device for a water inlet valve, comprising a valve body, an outer water tank, an inner water tank, a leak-proof water tank, an outer float, an inner float, a leak-proof float, and a lever; a water inlet channel and a water outlet channel being formed in the valve body, a control valve being installed in the valve body, the control valve controlling opening and closing of the water inlet channel and the water outlet channel; the outer water tank being installed on the valve body, a water inlet hole being disposed at a bottom of the outer water tank, the inner water tank being disposed in the outer water tank, the inner water tank having a height lower than that of the outer water tank, water overflowing from the outer water tank to the inner water tank; the lever being pivotally connected to the valve body, one end of the lever being connected to the outer float, the outer float being disposed in the outer water tank, another end of the lever being connected to the inner float, the inner float being disposed in the inner water tank, a plug being mounted to a lower end of the inner float; the leak-proof water tank being mounted on the valve body, the leak-proof water tank being in communication with the inner water tank via a water-passing channel, the lever being swung for the plug to close the water-passing channel or to open the water-passing channel; the leak-proof float being disposed in the leak-proof water tank, the leak-proof float being connected to the control valve, wherein when the leak-proof float rises, the control valve is driven to close the water inlet channel of the valve body.

2. The leak-proof device as claimed in claim 1, wherein the control valve includes a valve stein, a water plugging stopper, and a drive mechanism; a water sealing surface is disposed between the water inlet channel and the water outlet channel, the water sealing surface is in communication with the water inlet channel and the water outlet channel; a cavity is formed in the valve body above the water sealing surface, a mounting hole is formed in the valve body above the cavity; a middle portion of the valve stein is movably and sealedly mounted in the mounting hole, an upper portion of the valve stein extends out of the mounting hole and is connected to the drive mechanism, the drive mechanism drives the valve stein to move up and down, a back-pressure hole is formed in the water plugging stopper, a lower portion of the valve stein is movably mounted in the back-pressure hole of the water plugging stopper, the water plugging stopper is disposed in the cavity, a water-passing gap is defined between the water plugging stopper and the cavity, a back-pressure cavity is formed above the water-plugging stopper, the water-passing gap is in communication with the water inlet channel and the back-pressure cavity, the back-pressure cavity is in communication with the back-pressure hole, the back-pressure hole is in communication with the water outlet channel, a sealing end surface matching the back-pressure hole is formed on the valve stein, when the valve stein moves upwards, the sealing end surface opens the back-pressure hole, and the water inlet channel is in communication with the water outlet channel to feed in water, when the valve stein moves downwards and drives the water plugging stopper to move downwards, the sealing end surface blocks the back-pressure hole and the water plugging stopper blocks the water sealing surface, such that the water enters the back-pressure cavity via the water-passing gap, and water pressure enables the water-plugging stopper to block the water sealing surface to stop the water.

3. The leak-proof device as claimed in claim 2, wherein a lower portion of the valve stein is formed with a reduced neck section, and the reduced neck section of the valve stein is inserted in the back-pressure hole of the water plugging stopper.

4. The leak-proof device as claimed in claim 2, wherein the drive mechanism includes a swing rod, a compression spring, a connecting rod, and a limiting member; a middle portion of the swing rod is pivotally connected to the valve body, one end of the swing rod is connected to the valve stein, the valve stein moves up and down with the swing rod; another end of the swing rod is connected to one end of the connecting rod, the compression spring is mounted in the valve body, one end of the compression spring abuts against the valve body, another end of the compression spring abuts against the other end connected with the connecting rod of the swing rod for applying a force to swing the swing rod; the limiting member is movably mounted on the valve body, the limiting member is configured to restrict movement of the connecting rod, when the limiting member is pressed downwards to release the connecting rod, the compression spring drives the swing rod to swing and move the valve stein and the water plugging stopper downwards.

5. The leak-proof device as claimed in claim 4, wherein the limiting member is movably mounted in the valve body, a return spring is mounted between the limiting member and the valve body, a first magnetic element is mounted in the limiting member; a second magnetic element that can be attracted to the first magnetic element is mounted to an upper end of the leak-proof float; when the leak-proof float rises, the second magnetic element is attracted to the first magnetic element to move the limiting member downwards to release the connecting rod.

6. The leak-proof device as claimed in claim 5, wherein the valve body is provided with a mounting seat, a receiving cavity is formed between the mounting seat and the valve body, the limiting member is disposed in the receiving cavity, a hole is formed in the mounting seat, a middle portion of the limiting member is a limiting portion, the first magnetic element is mounted in a lower portion of the limiting member, the lower portion of the limiting member is inserted into the hole, the limiting portion of the limiting member has a diameter greater than that of the hole; one end of the return spring abuts against the mounting seat, and another end of the return spring abuts against the limiting portion of the limiting member.

7. The leak-proof device as claimed in claim 4, wherein an upper end of the limiting member is provided with a wedge portion, the connecting rod is provided with a recess corresponding to the wedge portion, the wedge portion of the limiting member is inserted into the recess of the connecting rod to restrict movement of the connecting rod.

8. The leak-proof device as claimed in claim 4, wherein the swing rod is connected to the connecting rod through an engaging block and an engaging groove.

9. The leak-proof device as claimed in claim 8, wherein the swing rod is provided with the engaging block, the connecting rod is provided with the engaging groove, and the engaging block of the swing rod is engaged in the engaging groove of the connecting rod to connect the swing rod to the connecting rod.

10. The leak-proof device as claimed in claim 8, wherein the connecting rod is radially connected to the swing rod.

* * * * *